Nov. 9, 1943.  H. J. MILLER ET AL  2,334,020
GLASS TO METAL SEAL
Filed Oct. 8, 1941  2 Sheets-Sheet 1

INVENTORS
HENRY J. MILLER AND
JOHN M. SPOONER
BY Charles McClair
ATTORNEY

Nov. 9, 1943.     H. J. MILLER ET AL     2,334,020
GLASS TO METAL SEAL
Filed Oct. 8, 1941            2 Sheets-Sheet 2

INVENTORS
HENRY J. MILLER AND
JOHN M. SPOONER
BY
Charles McClair
ATTORNEY.

Patented Nov. 9, 1943

2,334,020

UNITED STATES PATENT OFFICE 2,334,020

GLASS-TO-METAL SEAL

Henry J. Miller, South Orange, and John M. Spooner, Summit, N. J., assignors to Radio Corporation of America, a corporation of Delaware Application October 8, 1941, Serial No. 414,148

8 Claims. (Cl. 49—81)

Our invention relates to glass-to-metal seals, particularly to hermetic seals for envelopes of the type used in electron discharge devices and the like.

Readily oxidizable metals of the iron or steel type have not been joined directly to commercial grades of glasses to make mechanically strong and vacuum-tight seals because the oxide layer formed on the surface of the metal when heated to sealing temperature is so thick and porous as to make the junction with the glass unusable. At the minimum temperature to which most commercial low melting glasses must be heated for sealing, the formation of the thick porous layer of oxide on the surface of the iron in air is very fast. Even in a mild oxidizing atmosphere a layer about .008 inch thick is formed on iron at 600° in an estimated time of a few microseconds. Nor will clean unoxidized iron, heated in a non-oxidizing atmosphere, satisfactorily seal to glass. When a glass-to-iron seal is attempted in a neutral or reducing atmosphere, it has been found that the seal is mechanically weak.

Further, the wide difference in the thermal coefficient of expansion of iron and of the commercial low melting glasses has eliminated these materials from the manufacture of inexpensive seals because of the cracking strains imposed on the glass by the iron.

An object of our invention is an improved iron-to-glass seal.

Another object of our invention is an improved glass-to-metal seal for envelopes of electron discharge devices and the like.

A more specific object of our invention is means for controlling the thickness of the iron oxide layer on an iron body sealed to a glass body.

Another specific object of our invention is a method of preventing cracking strains in glass sealed vacuum-tight to iron.

The characteristic features of our invention are defined in the appended claims and preferred specific embodiments thereof are described in the following specification and shown in the accompanying drawings in which Figure 1 shows in section an iron-to-glass seal structure particularly useful for vacuum-tight metal envelopes of radio tubes and the like.

According to our invention the iron body to which the glass body is sealed is plated or covered with a thin smooth layer of metal, which within a relatively wide range of temperatures will pass by diffusion a controllable amount of oxygen from the atmosphere to the underlying iron. One specific example of our improved seal is cold rolled steel with a plating of silver between .00004 to .00025 inch in thickness, joined to commercial low melting glass. The permeability of silver to oxygen at temperatures between 600 and 900° C. is such that at these temperatures the silver plating will pass by diffusion enough oxygen to convert, in about three seconds, enough iron to iron oxide to produce an oxide layer less than approximately .000020 inch thick. This amount of iron oxide is insufficient to produce scaling and loosening of the bond between the iron and the silver. Photomicrographs indicate that some of this iron oxide, whether it be of the FeO or the $Fe_2O_3$ variety, permeates the silver and appears in small quantities on the surface of the silver toward the glass. The bond is so strong that the glass body cannot be stripped from the iron body without cracking the glass in regions removed from the seal. The increase in iron oxide forming time from a few micro-seconds to three seconds materially simplifies the control of the iron oxide thickness in the finished seal. Fortunately the sealing temperature of the silver plated iron-to-glass is not critical, it being observed that the temperature may vary from the minimum temperature at which the particular glass may be softened and sealed, such as 600° C. for commercial lead oxide boro-silicate glass, to above the melting point of silver of 960° C.

Figure 4:
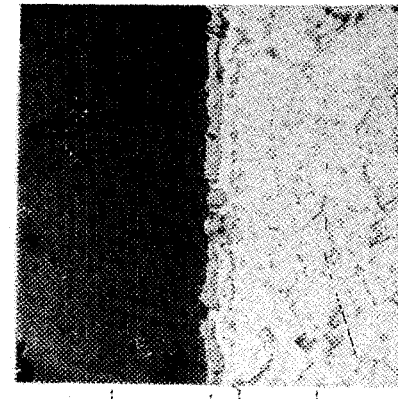
Figures 3 and 4 show photomicrographs of the seal region of an iron-to-glass seal made according to our invention, the magnification being the same as in Figure 2.
Figure 3:
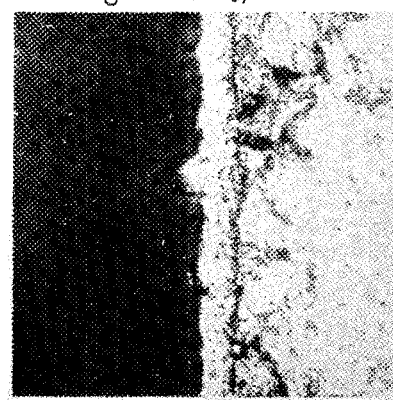
Figure 2:
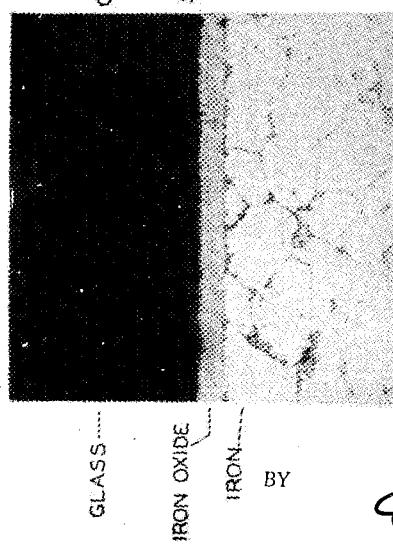
Figure 2 shows a photomicrograph of the seal region of an iron-to-glass seal of the conventional type.

A transverse section of one seal made according to our invention appears, when magnified 1000 diameters, as shown in Figure 3. The silver layer is joined to the iron by an iron oxide layer approximately .000020 inch thick, a trace of the iron oxide appearing on the glass side of the silver as an iron oxide film thinner than the silver film. The same glass and metal when sealed by the same firing schedule employed in making the seal of Figure 3, but without the silver layer, produces an iron oxide layer between the iron and glass about ten times as thick or about .0002 inch thick, as shown in Figure 2. An iron oxide layer of this thickness readily passes air and has little or no mechanical strength. When the iron with its silver plating is heated to a temperature of about 1000° C., the silver becomes molten and, as shown in Figure 4, flows into and mixes with the iron oxide thus producing between the iron body and the glass body an iron oxide layer rich in silver. Here most of the iron oxide appears to float to the surface of the silver, forming an iron oxide layer firmly bonded to the silver on the one hand and dissolved into the glass on the other. At the higher temperatures it is noticed the silver film has a tendency to draw into globules on the surface of the iron.

While the silver film may be less than .00004 inch thick, thinner films are not feasible in commercial practice because of the difficulty of preventing pores or holes through the film and exposure of the iron. The principal limiting factor as to the maximum thickness of the silver is the time necessary to diffuse oxygen through the film for oxidizing the surface of the iron.

As more fully hereinafter described, the iron and glass may be cooled according to one of the features of our invention in such a way as to eliminate glass strains in the seal region.

For convenience of description, our novel iron-to-glass seal is shown as applied to the header of a conventional metal envelope radio tube, although the seal may be employed for other uses and in other structural shapes. The particular envelope header shown in Figure 1 comprises a glass body in the form of a round glass disc or button 1 sealed along its periphery to an iron body in the form of a ring or band 2 which forms a part of a metal annulus 3, U-shaped in cross section, and having an outwardly extending flange 4 to which a metal envelope may be welded. Lead wires 5 for electrodes within the envelope pass through the button and are arranged in a circle concentric with and around the glass exhaust tube 6 at the center of the button.

Figure 1:
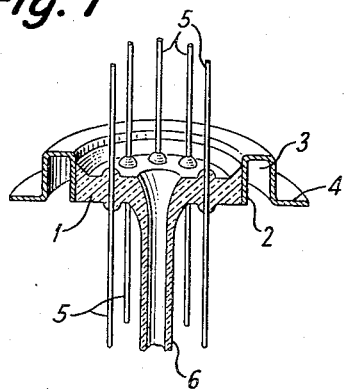
Figure 5:
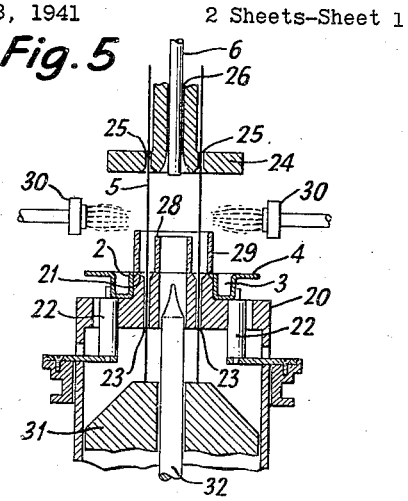
Figures 5, 6 and 7 show essential parts of one type of apparatus for making the seal structure of Figure 1, these three figures showing three successive steps in making the seal.
Figure 6:
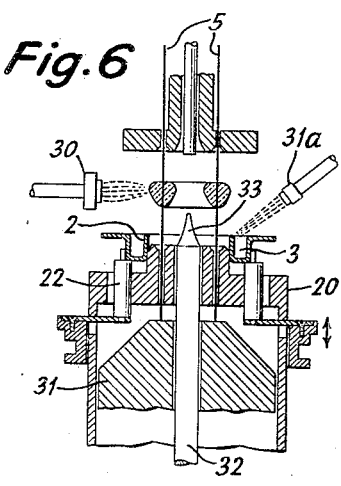
Figure 7:
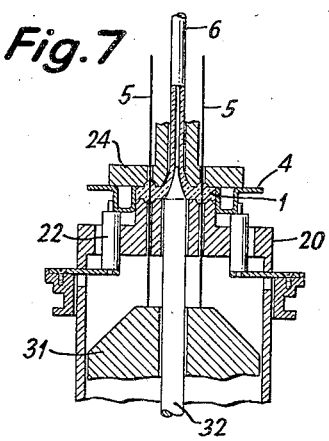

A machine for making the header of Figure 1 is more fully described in the Franke Patent 2,195,483, April 2, 1940, and essentially comprises, as shown in Figures 5, 6 and 7, a press mold for molding the glass into the metal ring 2 and around the lead wires. The molds are preferably rotated in gas flames to heat the glass and metal of the seal. It has also been found convenient to mount a number of the mold assemblies on the periphery of a rotating turret or dial and to index the turret step-by-step to bring the molds, with the glass and metal parts of the stem, successively into registry with gas flames spaced along the periphery of the turret. The molds comprise a plate 20 having on its upper side a raised round portion or forming block 21 with an outside diameter to snugly engage the inner wall of the iron ring 2. The vertical height of the block 21 is equal to or slightly greater than the length of the ring 2 so that when the ring rests in its lowermost position, as shown in Figure 5, flames from the gas burner cannot impinge upon the inner sealing surface of the ring. Pins 22 are provided for raising the upper edge of the ring above the top of the mold, as shown in Figure 6, to form a round saucer-shaped receptacle into which the molten glass may be pressed. The iron ring in its lowered position may thus be maintained at a relatively low temperature while the glass is being melted. The ring is suddenly raised at the proper time in the sealing cycle and, with the aid of hard pointed flames, may be heated to sealing temperature and the glass pressed into the ring within a few seconds. To position the lead-in wires during glass molding, a number of holes 23, slightly larger than the lead-in wires and extending through the block, are arranged in a circle concentric with the block. The press block or plunger 24 of the mold is mounted to reciprocate in a vertical line above the forming block and is provided with openings 25 in alignment with the openings 23 in the forming block and with a central opening 26 to receive the exhaust tube 6. As shown the lower end of opening 26 in the press block is flared and the lead-in wire openings 23 and 25 are countersunk to provide conical recesses to mold reinforcing fillets around the lead-in wires and exhaust tube.

The glass for the stem is supplied in the form of two glass collars 28 and 29, which, as shown, are set upon the forming block respectively inside and outside the circle of lead-in wires. Heat may be conveniently applied to the glass from gas burners 30 positioned to play upon the upper rims of the glass collars as they revolve with the molds. As the glass collars soften, their upper edges flow together and around the lead-in wires and form a plastic mass which adheres to the wires. To soften the glass without over-heating and oxidizing the iron ring 2, the lead-in wires and the adherent mass of glass are raised above the forming block. For this purpose plunger 31, below the forming block, is raised, pushing the wires and glass upwardly and directly into the path of horizontal gas flames. Here the glass is held until it becomes plastic and draws into a substantially uniform annulus, as shown in Figure 6. The pins 22 are then moved upwardly to raise the iron ring above the mold and to expose the ring to the hard pointed gas flames of the inclined burner 31a adjusted to play upon the outer surface of the ring. At the moment the iron ring reaches sealing temperature, plunger 31 is lowered and with the downward movement of the press block 24 the plastic glass annulus is flattened and squeezed against the inner wall of the iron ring. Plunger 32 with its pointed upper end 33 is raised to clear the opening through the exhaust tube junction. Best results have been obtained by immediately withdrawing the press block 24 and after again applying hard flames to the glass and to the iron ring, again lowering the press block 24 to press the glass button against the lower mold.

Good results have been obtained in making headers of the type shown in Figure 1 on machines having twenty-four press mold assemblies indexing step-by-step to bring the molds to rest for a period of about six seconds in each indexing position. The header rings 2 are of cold drawn steel electrolytically plated with silver to a depth of between .00004 and .00025 inch. The particular glass used is commercial "No. 12" lead glass having the following chemical composition, by weight,

| | |
|---|---|
| $SiO_2$ | 57.0 |
| $PbO$ | 28.0 |
| $Fe_2O_3$ | .06 |
| $Al_2O_3$ | 1.44 |
| $K_2O$ | 3.5 |
| $Na_2O$ | 5.0 |

With an indexing period of six seconds and a silver layer or film .00008 to .00010 inch thick one successful firing schedule is here described. The first seven or eight positions of the machine are used for feeding the glass collars, lead-in wires and iron rings to the press molds and if desired mild preheating may be employed in the eighth and ninth positions. In the tenth position hard fires are first played upon the glass. The temperature of the glass in the various positions is shown in Figure 7, in which the lower curve A shows the temperature of the glass at the lead wires obtained by a thermocouple, and in which the upper curve B shows the surface temperature of the glass observed by an optical pyrometer. The temperature of the glass is gradually raised to about 950° C. between the tenth and seventeenth positions. As the mold enters the eighteenth position the iron ring 2 is raised upwardly from the press block 21 and hard pointed flames are applied to the rim of the ring 2. Consistently good results have been obtained by bringing the iron ring to about 970° C. or slightly above the melting temperature of the silver. This sharp rise in temperature of the metal ring from 200 or 300° C. to 970° C. in about three seconds, while the mold is at rest in the eighteenth position, may be attained by the proper mixture of hydrogen, oxygen or air and illuminating or acetylene gas in the flame directed on the ring. Before the stem moves from the eighteenth position the upper press mold quickly moves down and presses the glass and retracts just before the mold moves into the nineteenth position. In the nineteenth position the mold may again press the glass to remove irregularities left by the first pressing.

Alternatively, the first pressing of the glass may be done at an iron ring temperature as low as 700° C. followed by a second pressing at a temperature in the seal region of 800 to 1000° C.

Figure 8:
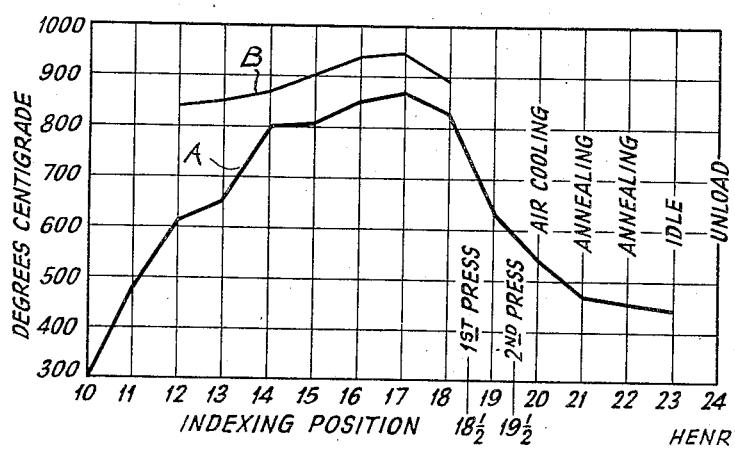
Figure 8 shows a graph of the rise and fall of the glass temperature during the sealing operation, according to our invention.

In the twentieth, twenty-first and twenty-second positions, and in accordance with a further and important feature of our invention, the glass body and the iron body of the header are cooled differentially in such a manner that the finished seal is substantially free of strains notwithstanding the wide difference in thermal coefficients of expansion of the glass and iron. As indicated in Figure 7 of the drawings, the molten glass, at the instant of contact with the ring 2, is completely enclosed in metal. The top and bottom molds 24 and 21 must be maintained at a temperature much lower than the temperature of the ring 2 during sealing, otherwise the glass would stick to the molds as well as to the iron ring. In any case the mass of the metal molds preclude elevated temperatures and the sudden changes in temperature required in high speed manufacture. This difference in temperature between the periphery of the glass button at the ring and its flat surfaces at the molds would cause cracking strains in the glass. These strains apparently persist even though the upper mold may be quickly withdrawn and the glass separated from the lower mold. To quickly reduce this high temperature gradient after pressing and sealing, the cooling of the ring 2 is accelerated by mild streams of cold air directed against the iron ring. As indicated in the graph of Figure 8, the glass drops to a temperature of about 550° C. in the twentieth position and the cooling air is adjusted to bring the temperature of the iron ring to about the same level. With some glasses which will seal at lower temperatures it is possible to eliminate the air cooling in position twenty, particularly where the outside surface of the iron ring may be dark enough to radiate the heat from the ring and permit its cooling without the assistance of a blast of air. If the outer surface of the ring is silver plated and is comparatively bright, so that the specific heat radiation from the ring may be low, air cooling is required in the twentieth position.

After the iron ring and the glass button are brought to about the same temperature, such as 550° C. in the twentieth position, the next problem is to cool the seal to room temperature without cracks or strains. The coefficient of expansion of iron is about twice that of No. 12 lead glass, which means that the iron will shrink twice as much as the glass for each degree of drop in temperature. According to our invention we propose to cool the glass at a rate enough greater than the rate of cooling of the iron to cause the shrinkage of the glass button to equal that of the iron ring. Accordingly in the twenty-first position, soft annealing fires are played upon the iron ring 2 to retard the rate of cooling of the ring while the glass is cooling by contact with the molds and by conduction through the lead wires 5. It has been found desirable to repeat these soft annealing fires in the twenty-second position and to momentarily hold the glass at a temperature of about 450° C. The temperature of the iron is probably slightly higher than the glass temperature in the twenty-second position. All fires and cooling may be omitted in the twenty-third position and the finished stem will have little or no strains in the glass upon cooling to room temperature. The stems are unloaded in the twenty-fourth position. According to this feature of our invention the differential cooling of the glass and of the iron may be controlled so as to place either tensional or compressional strains as desired in the sealing region of the glass. The distribution of strains in the glass may be easily determined by projecting an image on a screen produced by transmitting polarized light through the glass button perpendicular to the plane of the button.

Since the manufacture of a gas-tight and mechanically strong seal between glass and iron depends according to our invention upon accurate control of the thickness of the iron oxide layer, it is important to deposit on the iron a silver plating that is smooth and free of holes through which air might attack the iron. Silver is preferably electroplated on the iron and typical striking and plating solutions for the bath are here described. After degreasing the iron in an 8% solution of sodium carbonate for fifteen minutes, the iron is washed in water and then etched for one minute in a 10% solution of hot hydrochloric acid. After thorough rinsing in water, the iron is then plated in a striking solution for twenty-five seconds with an electrolytic current of about 0.093 ampere per square inch of iron. The striking solution comprises—

| | |
|---|---|
| AgCN (silver cyanide) grams per liter $H_2O$ | 1.48 |
| KCN (potassium cyanide) do | 88.7 |
| $K_2CO_3$ (potassium carbonate) do | 19.25 |

The iron ring is then transferred to a plating solution comprising—

| | |
|---|---|
| AgCn (silver cyanide) grams per liter $H_2O$ | 17.5 |
| KCN (potassium cyanide) do | 35.6 |
| $K_2CO_3$ (potassium carbonate) do | 37.5 |
| $Na_2S_2O_3$ (sodium thiosulfate) do | 1 |
| $NH_4OH$ (ammonium hydroxide) c. c. per liter $H_2O$ | 10 |

Good seals have been obtained with silver platings obtained by an electrolytic current of 0.042 ampere per square inch of iron flowing for 2.5 to 8 minutes. The iron portions of headers comprising the iron ring 2, the U-shaped anodes 3 and the radial flange 4, and having a total surface area of about 2.5 square inches will receive about 0.188 gram of silver in 2 to 2.5 minutes, deposited as a smooth non-porous layer .00004 to .00005 inch thick. When the plating time is increased to 8 minutes the silver thickness is estimated to be about .00017 inch. The plating thickness may in some cases not be uniform throughout the surface of the header because of the irregular shape of the headers and the non-symmetrical electrical fields produced by the electrode in the electrolytic bath.

An overcoating of black silver sulphide, obtained as by heating the silver plated iron at 200° C. in hydrogen sulphide gas or by dipping in liquid ammonium hydrosulphide, has been found to aid in the fusion of the iron oxide, iron and silver. Apparently the sulphur acts as a flux to bond the silver and steel, although silver is considered to be quite insoluble in iron.

Glass-to-metal seals according to our invention are strain-free or with slight compression strain notwithstanding wide differences in thermal coefficients of expansion of the glass and the metal. The oxide layer formed on the surface of iron according to our invention may be controlled to produce a seal that is hermetically tight and mechanically strong. According to our invention inexpensive glasses and metals may now be hermetically joined, which heretofore were unusable. Our seals are easy to make and inexpensive to manufacture.

We claim:

1. A glass-to-metal seal comprising an iron body, a glass body, a film of silver between the surfaces of said bodies, and layers of iron oxide between the silver film and said bodies, said oxide layers being thinner than the silver film and firmly bonded to said bodies.

2. A method of sealing iron to glass comprising plating the iron with a continuous non-porous adherent film of silver to a depth of between .00004 to .00025 inch, heating the iron to a temperature above the sealing temperature of the silver and glass, and maintaining said temperature until iron oxide appears on both sides of the silver film and then pressing said glass against said film.

3. The method of sealing an iron body to glass comprising plating said body with a layer of silver to a depth of between .00004 and .00025 inch, heating said body to about the melting temperature of silver and, while maintaining said temperature, pressing a molten mass of glass against said body.

4. The method of sealing metal of the iron class to glass comprising plating the metal with a thin impervious film of silver, heating the glass to at least its sealing temperature, then rapidly heating the silver plated metal in high temperature oxidizing gas flames, the time-temperature of the metal heating being only sufficient to produce on either side of the silver layer a thin film of metal oxide, and immediately pressing the melted glass into contact with the plated metal.

5. The method of sealing an iron body to glass comprising plating said body with a layer of silver to a depth of more than .00004 inch, heating said glass and said iron body to a point intermediate the glass softening temperature and silver melting temperature, pressing the silver surface of the iron body and the glass together, and then elevating the iron temperature to above the melting point of said silver, and then cooling the seal region of the iron body and the glass.

6. The method of sealing an iron body to glass, comprising plating said body with a thin film of silver, heating the glass to above its molten temperature, then heating the iron to above the melting temperature of the silver and then pressing the glass against the silver plated iron surface.

7. A glass-to-metal seal comprising a glass body and an iron body, iron oxide hermetically joining the two bodies, and a film of silver within and coextensive with the oxide layer.

8. A glass-to-metal seal comprising an iron sheet of extended surface area, a glass body of extended surface area conforming in shape to the surface of the iron body, a silver rich iron oxide layer hermetically joined to the extended surfaces of the iron and of the glass.

HENRY J. MILLER.
JOHN M. SPOONER.